(12) United States Patent
Landuyt

(10) Patent No.: US 7,553,227 B2
(45) Date of Patent: Jun. 30, 2009

(54) RESIDUE SPLITTER

(75) Inventor: Koen Landuyt, Maldegem (BE)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 11/981,086

(22) Filed: Oct. 31, 2007

(65) Prior Publication Data
US 2009/0111548 A1    Apr. 30, 2009

(51) Int. Cl.
*A01F 12/30* (2006.01)
(52) U.S. Cl. ..................................................... 460/111
(58) Field of Classification Search ................. 460/111, 460/112, 901, 119; 56/503; 239/650, 673, 239/667, 666, 668, 661
See application file for complete search history.

(56) References Cited

U.S. PATENT DOCUMENTS

| | | | |
|---|---|---|---|
| 1,233,749 A | 7/1917 | Bruner | |
| 2,587,678 A | 3/1952 | Aasland et al. | 275/8 |
| 2,708,582 A | 5/1955 | Adams | 275/3 |
| 2,848,238 A | 8/1958 | Stevens | 275/3 |
| 5,569,081 A | 10/1996 | Baumgarten et al. | 460/112 |
| 5,797,793 A | 8/1998 | Matousek et al. | 460/111 |
| 5,976,011 A * | 11/1999 | Hartman | 460/111 |
| 6,416,405 B1 * | 7/2002 | Niermann | 460/79 |
| 6,602,131 B2 | 8/2003 | Wolters | 460/111 |
| 6,663,485 B2 | 12/2003 | Niermann | 460/79 |
| 6,685,558 B2 | 2/2004 | Niermann et al. | 460/111 |
| 6,736,721 B2 | 5/2004 | Niermann et al. | 460/112 |
| 6,860,805 B2 | 3/2005 | Kuhn et al. | 460/111 |
| 6,939,221 B1 | 9/2005 | Redekop et al. | 460/111 |
| 6,976,913 B2 | 12/2005 | Duquesne et al. | 460/111 |
| 7,223,168 B2 | 5/2007 | Anderson et al. | 460/111 |
| 7,390,253 B2 * | 6/2008 | Farley et al. | 460/111 |
| 2002/0072400 A1* | 6/2002 | Foth | 460/112 |
| 2005/0059445 A1 | 3/2005 | Niermann et al. | 460/112 |
| 2006/0006256 A1 | 1/2006 | Smith et al. | 239/666 |
| 2006/0183519 A1* | 8/2006 | Benes | 460/111 |

FOREIGN PATENT DOCUMENTS

| | | |
|---|---|---|
| DE | 3529801 | 1/1987 |
| EP | 0104622 | 9/1983 |

* cited by examiner

*Primary Examiner*—Árpád Fábián-Kovács
(74) *Attorney, Agent, or Firm*—Michael G. Harms; John William Stader; Patrick M. Sheldrake (57) ABSTRACT

A residue splitter apparatus for use with a horizontal spreader assembly that employs a pair of spreader paddles disposed side-by-side to rotate about respective generally vertical axes for controlling the spread width distribution of crop residue on and over a field, and the method of use thereof, including a flow guide element located generally intermediate to the spreader paddles of the horizontal spreader assembly with crop residue flow surfaces that extend rearwardly from a front edge portion of the flow guide element and sidewardly to free end portions generally aft of at least portions of the spreader paddles to receive and direct the flow of crop residue from such spreader paddles. Preferably, the flow guide element is laterally expandable to permit the flow of crop residue from the spreader paddles to be adjustably varied to effect a desired pattern of crop residue flow from the spreader paddles, for instance, so as to better and more evenly distribute the flow side-to-side over a swath of an agricultural field from which the crop was harvested.

24 Claims, 8 Drawing Sheets

RESIDUE SPLITTER

TECHNICAL FIELD

This invention relates generally to an agricultural combine and a horizontal spreader assembly therefor, and more particularly to a residue splitter apparatus for use with a horizontal spreader assembly for controlling the spread width distribution of straw or other crop residue in a sideward direction on and over a field, and the method of use thereof. More specifically, the invention relates to a residue splitter apparatus that includes a flow guide element for guiding and directing crop residue being discharged from a horizontal spreader assembly that employs a pair of spreader paddles disposed side-by-side to rotate about respective generally vertical axes. The front edge portion of the flow guide element is located generally intermediate to the spreader paddles of the horizontal spreader assembly and the flow guide element includes crop residue flow surfaces that extend rearwardly from the front edge portion and sidewardly to free end portions generally aft of at least portions of the spreader paddles to receive and direct the flow of crop residue from such spreader paddles. Preferably, the flow guide element is laterally expandable to permit the flow of crop residue from the spreader paddles to be adjustably varied to effect a desired pattern of crop residue flow from the spreader paddles, for instance, so as to better and more evenly distribute the flow side-to-side over a swath of an agricultural field from which the crop was harvested.

BACKGROUND ART

Historically, agricultural combines have typically included or had associated therewith a crop residue spreader for disposing onto the field from which the crop was harvested the straw and other residue separated from the harvested crop. In addition, some combines have employed a chaff spreader for spreading chaff residue separated from the grain by the cleaning apparatus or system onto the crop field. With earlier spreaders, however, in many instances, uneven distribution of the crop residue occurred, with a greater or heavier concentration often being distributed nearer the center of the swath and a lesser or lighter concentration being distributed father sidewardly. Such uneven distribution resulted in various problems such as, but not limited to, subsequent difficulty in passing fall tillage tools through residue clumps or thick areas, uneven insulation of the field, resulting in uneven field warming and thawing and subsequent uneven crop emergence during the following planting season, and other problems resulting from increased rodent and insect habitat.

Consequently, it was recognized that it would be desirable to be able to spread the straw, chaff, and other residue as evenly as possible over the entire width or swath of that section of the field over which the combine has just passed and from which crops had been harvested. It was also recognized that, in some instances, in order to compensate for crop type, varying moisture and weather conditions, such as wind and the like, and also combine header width, it would be further desirable to have an ability to adjust the crop residue spread.

Efforts to address such concerns and desires have been ongoing, and various crop residue spreaders have been developed which can propel residue a distance equal to about one half the width of a typical combine header, rather than simply dropping or distributing the crop residue behind the spreader. However, such spreaders have continued to suffer from various shortcomings. Many of such spreaders have exhibited a tendency to provide uneven crop residue distribution or coverage in the side-to-side direction over the swath, especially on uneven and varying terrain and in varying wind conditions. For example, with reference to a horizontal spreader, that is, a spreader utilizing one or more rotary impellers or other elements rotatable about generally vertical axes, including axes whose primary orientation is vertical but which may be tilted at acute angles to vertical, and configured for directing a flow or flows of crop residue generally rearwardly and at least somewhat sidewardly, the resultant distribution has often tended to be uneven in the sideward direction, for instance, typically thicker in one region or in one portion of the swath, and thinner or less uniform in another region or another portion of the swath, sometimes due, in part, to varying geographical and environmental conditions. Often, the distribution has been heaviest in the portion of the swath within the combine width, with limited distribution beyond such width.

In recent years, several crop residue flow distributor constructions have been developed for use with vertical, as opposed to horizontal, crop residue spreaders of agricultural combines, including the constructions disclosed and discussed in U.S. Pat. No. 7,223,168 and co-pending U.S. patent application Ser. No. 11/804,913. Such constructions have been specifically designed for use with vertical crop residue spreaders, however, and not for use with horizontal spreaders, as a consequence of which, while more even crop residue distribution has been possible when vertical spreaders have been utilized, there has continued to be a problem with the distribution of crop residue when horizontal spreaders are employed.

Accordingly, what has continued to be sought is a crop residue flow distributor that can be utilized with a horizontal crop residue spreader and which can effect more even distribution side-to-side over a region of an agricultural field from which the crop was harvested so as to thereby achieve the advantages, and avoid the shortcomings and problems, of the prior art devices, discussed hereinabove. Users have desired a construction that will provide to them the ability to adjustably distribute or guide portions of a crop residue flow discharged from a horizontal spreader in a desired pattern across the entire width or swath of the harvest cut, under varying geographical and environmental conditions. As a consequence of the continuing efforts to develop improved constructions for use with horizontal spreaders that will overcome the various problems discussed hereinabove, it has now been found that desirable and reliable results can be achieved by employing a residue splitter apparatus, as described hereinafter, that can be employed with horizontal spreaders to deliver improved side-to-side distribution of the crop residue and which can, with some embodiments and in some instances, be adjustably reconfigured to some extent to permit the crop residue flow to be distributed in accordance with desired patterns.

SUMMARY OF THE INVENTION

There is thus disclosed herein a residue splitter apparatus, sometimes referred to hereinafter more simply as a residue splitter, for an agricultural combine that can be employed with a horizontal spreader apparatus and which is operable for discharging a flow of straw or other crop residue in a more sidewardly direction for a more uniform or even deposit on and over a field. More particularly, there is disclosed a residue splitter apparatus that includes a flow guide or distributor element that is positionable generally intermediate to the spreader paddles of the horizontal spreader apparatus and which includes crop residue flow surfaces on the leading sides of the flow guide element that extend rearwardly from a front edge portion and sidewardly to generally aft of at least portions of the spreader paddles to receive and direct the flow of crop residue from such spreader paddles. The residue splitter apparatus preferably also includes an adjustment mechanism that is operable to adjust the lateral expanse of the crop residue flow surfaces to controllably guide and direct the sidewardly flow of crop residue impinging the flow guide element by greater or lesser amounts. By so positioning the flow guide element and adjusting the lateral expanse of the crop residue flow surfaces, a user can alter and redirect a portion of the flow of crop residue from the horizontal spreader so as to effect a desired pattern of crop residue distribution from such spreader, such as to compensate for changing geographical and environmental conditions, in order that, under such conditions, a better and more even distribution of the crop residue may be realized over the entire width of the cut.

According to a preferred aspect of the invention, the residue splitter apparatus includes a distributor or flow guide element portion, hereinafter sometimes referred to as the flow guide or the flow guide element, that has an front edge portion, with opposed wing or arm portions extending rearwardly and sidewardly therefrom to free end portions, and leading side surfaces extending generally between top and bottom portions of the flow guide element portion, with the extending leading side surfaces defining crop residue flow surfaces. The flow guide element portion is supported on a combine, such as generally intermediate to the spreader paddles of the horizontal spreader thereof, with its arm portions extending rearwardly and sidewardly to the free end portions thereof that are positioned generally aft of at least portions of the spreader paddles of the horizontal spreader. The crop residue flow surfaces of the flow guide element are thus disposed generally adjacent to portions of the spreader paddles to be impacted by at least a portion of the crop residue being flung towards the flow guide element by the spreader paddles so that such residue impacting the crop residue flow surfaces will flow along such crop residue flow surfaces and be projected therefrom sidewardly and outwardly for distribution over a field.

In its preferred forms, the residue splitter apparatus also includes an adjustment mechanism operable to control the lateral expanse of the flow guide element, such that the configuration and orientation of the flow surfaces of the flow guide element can be adjustably varied to some extent, including as may be required or desired by a user, to controllably vary the side-to-side spread of crop residue. In more advanced forms, the adjustment mechanism may be remotely controllable or operable such that a combine user can vary the lateral expanse of the flow guide element during harvesting operations to achieve a desired distribution of the crop residue behind the combine.

DETAILED DESCRIPTION OF THE INVENTION

Figure 1:
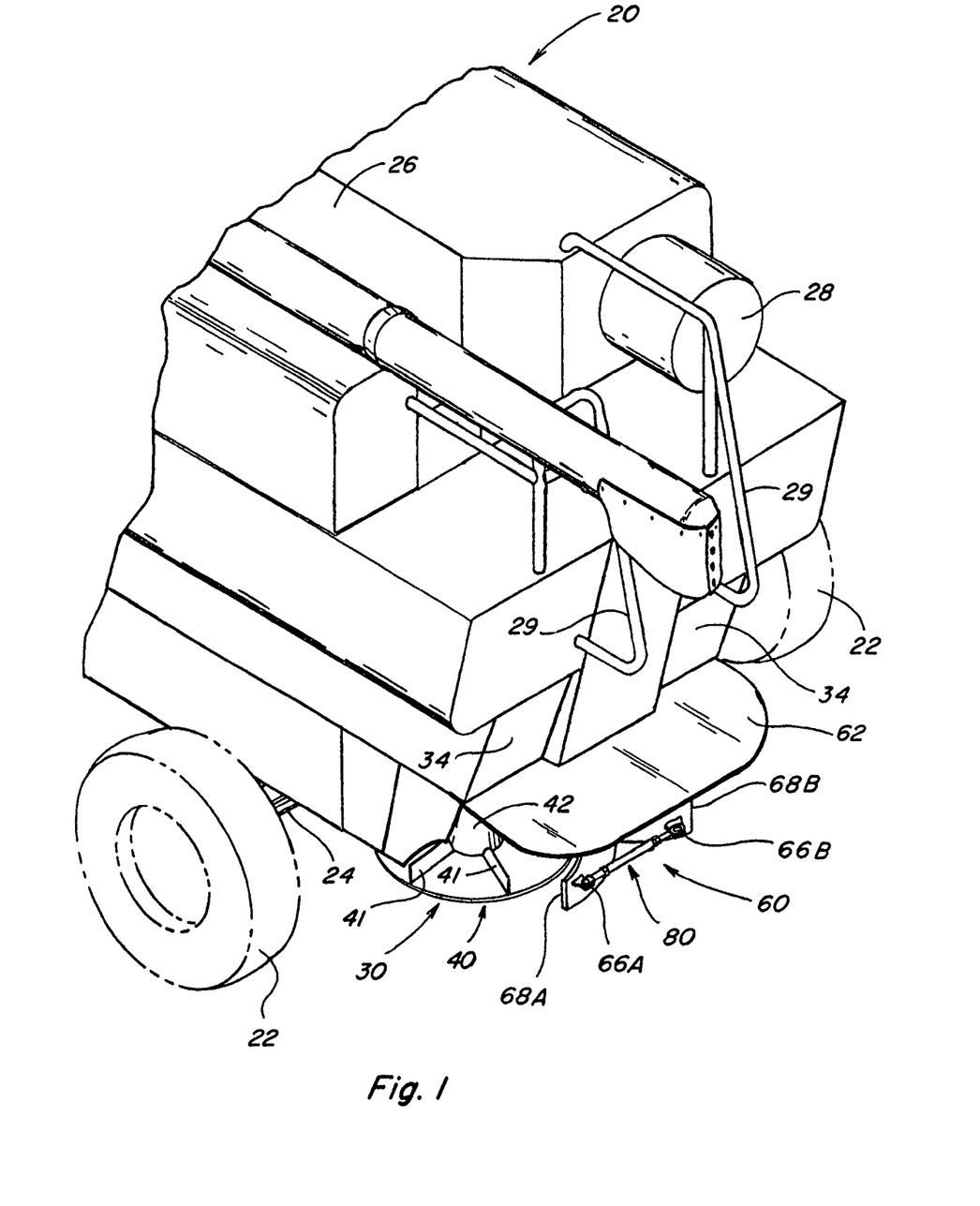
FIG. 1 is a partial perspective view of the rear end of a typical combine, the combine having installed thereon a horizontal spreader assembly, including counter-rotating spreader paddles, and a residue splitter according to the present invention.
Figure 2:
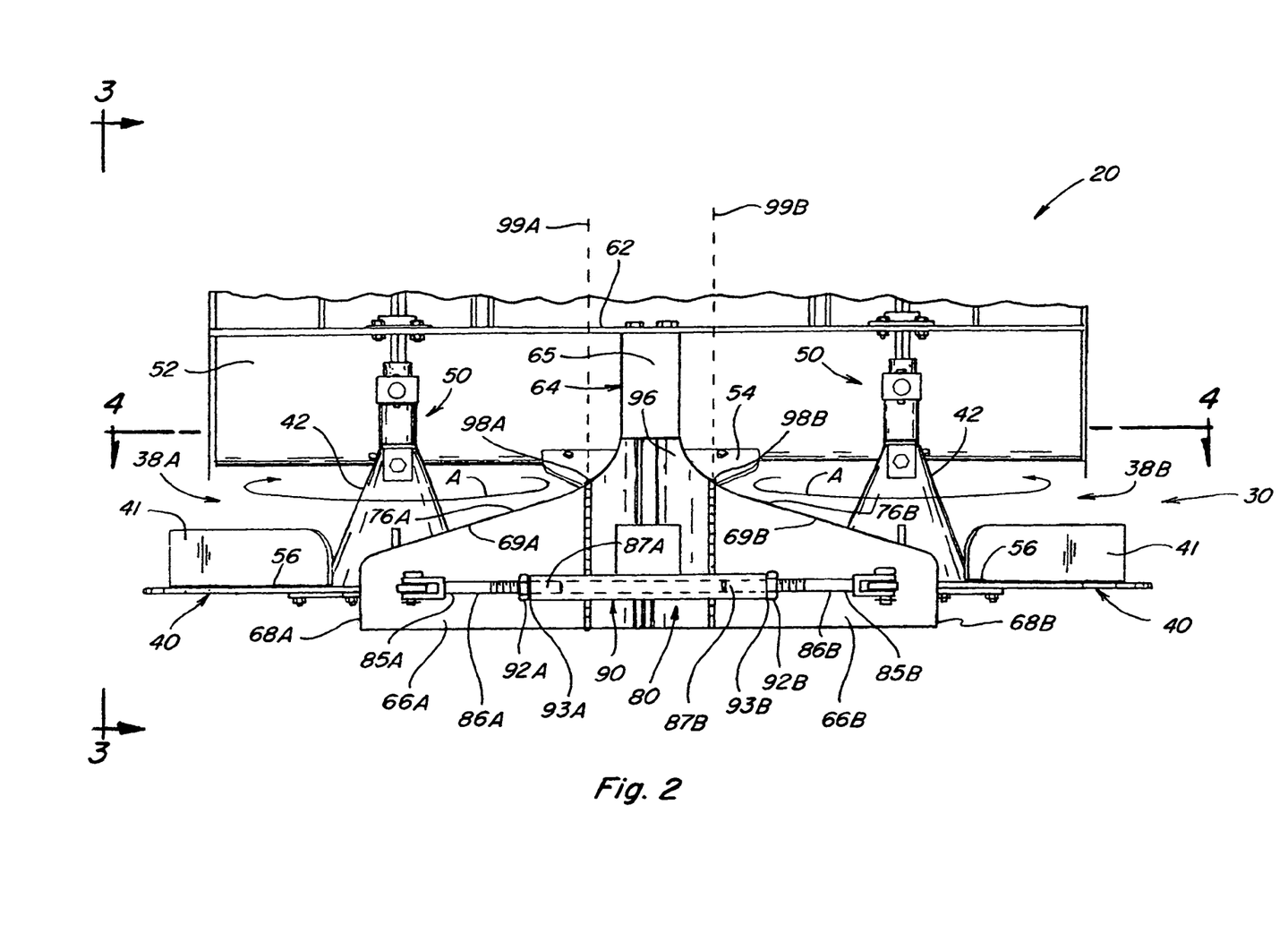
FIG. 2 is a partial rear view of the combine depicted in FIG. 1, showing the lateral relationship of the counter-rotating spreader paddles and the residue splitter.
Figure 3:
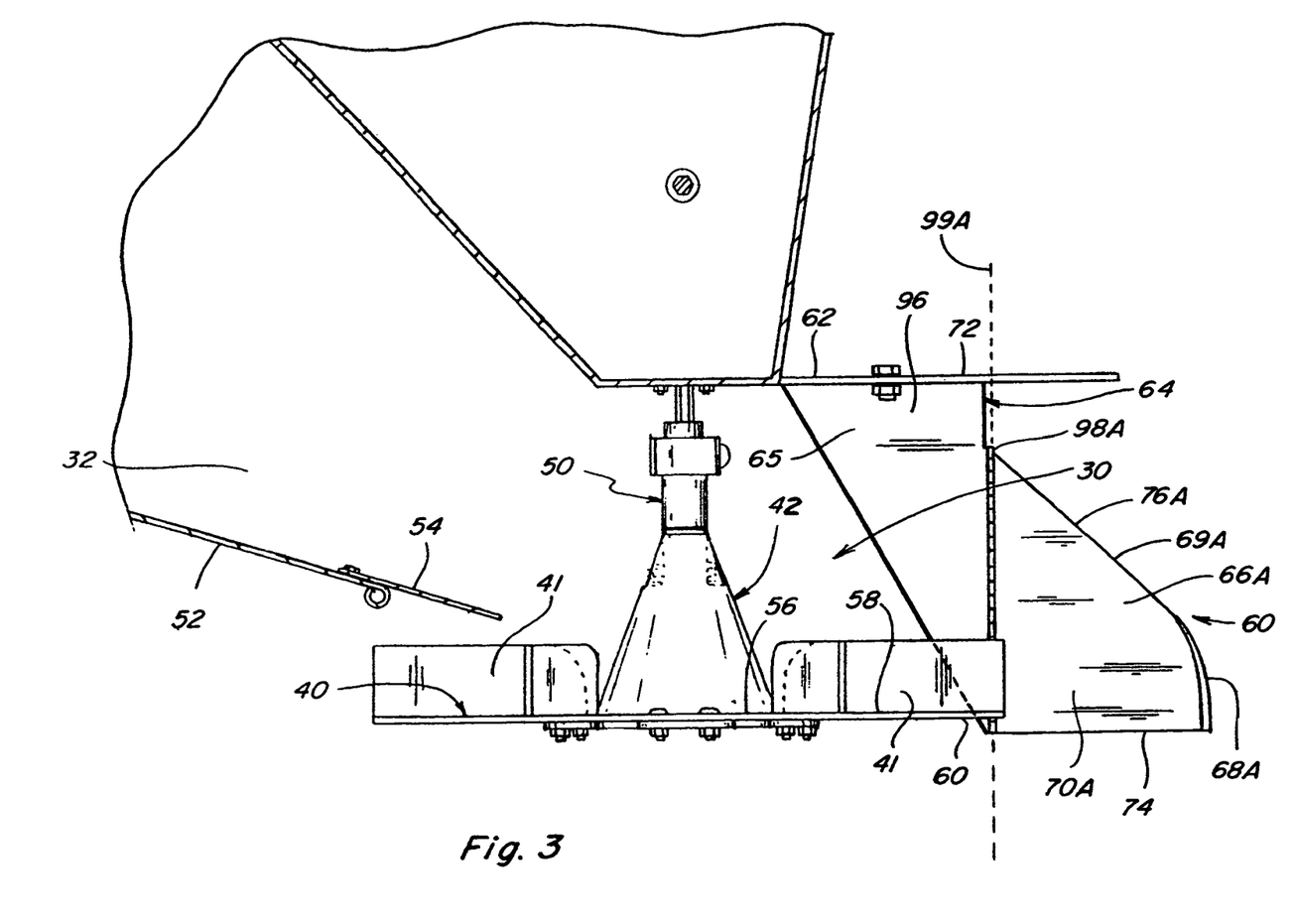
FIG. 3 is a partial view of the right side of the spreader assembly and associated residue splitter taken generally along cut 3-3 of FIG. 2.
Figure 4:
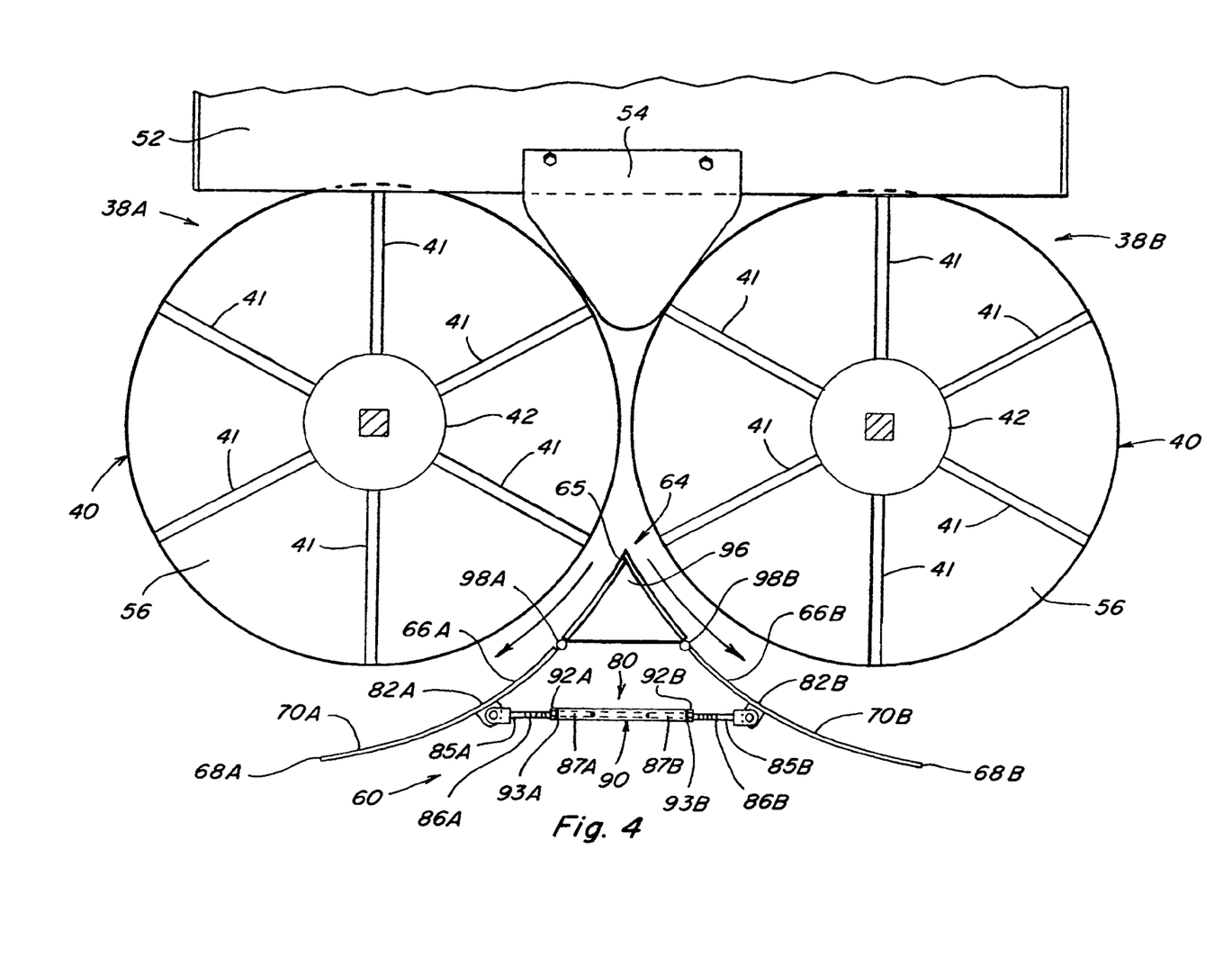
FIG. 4 is a view of the spreader assembly and associated residue splitter of FIG. 2 taken generally along cut 4-4 of FIG. 2.

Referring now to the drawings, wherein like numerals refer to generally like items and wherein certain numerals are applied on a representational basis to selected, representative items of a class of like items instead of to all of the depicted like items, FIG. 1 depicts the rear portion of a typical combine 20 having a pair of rear tires 22 mounted upon a rear axle 24, with a grain auger or threshing rotor 26, an engine radiator air screen 28, and handrails 29 mounted upon the upper structure of the combine 20. A conventional horizontal spreader assembly 30, as better shown in FIGS. 2-4, is mounted generally below a crop residue discharge chute 32 (FIG. 3). For safety and other purposes, removable drive linkage cover plates 34 (FIG. 1) enclose associated drive linkages. When the threshing rotor 26 is operating, crop residue from such operation is discharged into discharge chute 32 which channels and directs the crop residue flow towards a pair of preferred spreader head assemblies 38A and 38B (FIGS. 2 and 4) mounted side-by-side to one another.

The spreader head assemblies 38A and 38B of the depicted spreader assembly each include a spreader paddle 40, with a plurality of associated spreader bats 41 positioned thereon, and a spreader cone 42 to which the spreader paddle 40 may be joined or secured. For purposes of further discussion of the present invention, the spreader paddles 40 for the spreader head assemblies 38A and 38B may be considered generally similar to one another, although they may differ from one another if desired by a user. The spreader cone 42 so depicted is of a well known construction and is operably connected to a conical axle linkage 50 (FIGS. 2 and 3), which is also of well known construction. The design and configuration depicted is provided for illustrative purposes only since the particular design and configuration of the spreader assembly and the spreader paddles thereof is not considered to be critical to the present invention, which invention is intended for use with horizontal spreaders of various designs and configurations that employ spreader heads mounted side-by-side for rotation about generally vertical axes.

Operation of such a horizontal spreader assembly is well known. In general, as is best envisioned with reference to FIGS. 2-4, during a harvesting operation crop residue is directed to discharge chute 32 (FIG. 3) where it flows rearwardly along an angled floor 52, and a triangular floor extension plate 54 that prevents the greater portion of the crop residue passing thereacross from falling directly downward to the ground between the spreader head assemblies 38A and 38B, towards generally counter-rotating left and right spreader head assemblies 38A and 38B (FIGS. 2 and 4). The spreader paddles 40 of such spreader head assemblies 38A and 38B thus counter-rotate relative to one another, with the left spreader paddle 40 here shown rotating in a clockwise direction and the right spreader paddle 40 rotating in a counter-clockwise direction, as indicated by arrows A in FIG. 2. As the crop residue falls onto the top surfaces 56 of the spreader paddles 40, the spreader bats 41 contact the crop residue and propel it generally rearwardly and somewhat sidewardly behind the combine 20.

The residue splitter of the present invention is so designed and located as to intersect at least a portion of such crop residue being propelled by the spreader paddles 40 to channel the flow of such crop residue in a desired manner.

As is best shown in FIGS. 2-4, residue splitter 60 is mounted, utilizing any suitable mounting hardware or methods, generally intermediate the spreader head assemblies 38A and 38B, such as by being connected to a cover plate 62 (FIGS. 2 and 3) that extends rearwardly over at least a portion of the spreader assembly 30. Such residue splitter 60 includes a flow guide element 64 having a leading or front edge portion 65, typically of a somewhat wedge-shaped configuration, with wing or arm portions 66A and 66B extending generally rearwardly and somewhat sidewardly therefrom to free end portions 68A and 68B located generally aft of at least portions of the spreader paddles 40 of spreader head assemblies 38A and 38B of spreader assembly 30.

The arm portions 66A and 66B of flow guide element 64 may be of any suitable material, such as, by way of example and not of limitation, sheet metal or plastic, and of suitable thickness so as to be generally rigid when in use, and to generally absorb the impact of impinging crop residue without deforming, but may, in some embodiments, retain some end-to-end flexibility. The upper edges 69A and 69B (FIG. 2) of the arm portions 66A and 66B are preferably angled or tapered to some extent over some portions thereof to permit some of the crop residue being propelled rearwardly by the spreader paddles 40 to pass over the tops of the arm portions 66A and 66B for distribution behind the combine, thus acting as metering edges to some extent.

The leading side surfaces 70A and 70B (FIG. 4) of flow guide element 64, which surfaces include the front sides of flow guide element 64, including the front sides of arm portions 66A and 66B, extending between top and bottom ends 72 and 74 (FIG. 3) of flow guide element 64, also form and act as flow guide surfaces for the crop residue being flung outwardly by the counter-rotating spreader paddles 40 and impacting such surfaces 70A and 70B. Such surfaces preferably have a somewhat arcuate, typically concave, shape so as to better direct the crop residue outwardly and sidewardly therefrom in a somewhat arc-like path.

When residue splitter 60 is so mounted and configured for use with the horizontal spreader assembly 30 during a harvesting operation, a relatively small portion of the crop residue transiting the discharge chute 52 will pass over the triangular floor extension plate 54 and fall to the ground between the spreader head assemblies 38A and 38B while the bulk of the crop residue transiting such discharge chute 52 will be directed to and fall upon spreader paddles 40 to be propelled rearwardly and sidewardly thereby for distribution. A portion of the crop residue being propelled rearwardly by spreader paddles 40 will pass over the top edges 76A and 76B (FIGS. 2 and 3) of arm portions 66A and 66B to be deposited on the field behind the combine and generally aft of such arm portions 66A and 66B, while other portions of the crop residue being propelled towards the residue splitter 60 by spreader paddles 40 will be intersected by the flow guide surfaces 70A and 70B (FIGS. 2 and 4) of residue splitter 60 and directed along such flow guide surfaces 70A and 70B for more sidewardly distribution on the field, instead of the rearwardly distribution that would otherwise occur. The remainder of the crop residue that is being propelled by spreader paddles 40 more sidewardly, beyond the extent of the free end portions 68A and 68B of arm portions 66A and 66B, will continue to be distributed in the sideward direction essentially as in the absence of the residue splitter 60. The use of such a residue splitter thus allows a user to redirect at least a portion of the crop residue that would otherwise be distributed generally rearwardly of the combine by a horizontal spreader assembly more sidewardly so as to effect a more uniform distribution of crop residue across a swath behind the combine.

Preferably, as best illustrated in FIG. 4, in order to better account and adjust for variable conditions during a harvesting operation or between different harvesting operations, including differences in crops being harvested, the residue splitter 60 may also include an adjustment mechanism 80 for adjustably controlling and varying the lateral expanse of the residue splitter, such as by controlling the distance between spacing points 82A and 82B of the arm portions 66A and 66B. In the embodiment of FIG. 4, first ends 85A and 85B of respective threaded shafts 86A and 86B are connected to spacing points 82A and 82B by any appropriate connection hardware or methods, including by way of illustration only, and not of limitation, hinge, knuckle, or rotary joint assemblies, and the second ends 87A and 87B of such threaded shafts 86A and 86B are mated to a centrally positioned adjustment tube 90 that is operable to control and vary the amount by which the second ends 87A and 87B extend into adjustment tube 90.

In the particular embodiment depicted in FIG. 4, adjustment tube 90 is shown as having axially aligned threaded nut-like members 92A and 92B, complementarily sized to threadedly engage threaded shafts 86A and 86B, configured to form swivel joints at the opposed ends 93A and 93B of adjustment tube 90 so that the members 92A and 92B can be axially rotated relative to adjustment tube 90 while such adjustment tube is maintained relatively stable. With such a configuration, second ends 87A and 87B of the threaded shafts 86A and 86B can be threadedly engaged with members 92A and 92B which can then be axially rotated to thread the seconds ends 87A and 87B of threaded shafts 86A and 86B into adjustment tube 90 by desired amounts. As the threaded shafts 86A and 86B are increasingly drawn into the adjustment tube 90, the arm portions 66A and 66B will be increasingly drawn in towards one another, at least within the degree of flexibility of the arm portions, and as the threaded shafts are increasingly pushed outwardly away from the adjustment tube 90, the arm portions will be pushed away from one another, at least within the degree of flexibility of the arm portions.

If greater movement than that which can be achieved through simple flexure of the arm portions is desired, or if the arm portions are so designed that little, if any flexure is possible under normal operating conditions, the arm portions 66A and 66B may be separate elements that are hingedly mounted to a front body portion 96 of flow guide element 64, as at hinge points 98A and 98B for rotatable movement about hinge axes of rotation 99A and 99B. With such configuration, as the threaded shafts 86A and 86B are increasingly drawn into the adjustment tube 90, the arm portions 66A and 66B will be increasingly drawn in towards one another and the arm portions 66A and 66B will be caused to rotate about axes of rotation 99A and 99B towards one another. Similarly, as the threaded shafts are increasingly pushed outwardly away from the adjustment tube 90, the arm portions will be pushed away from one another and the arm portions 66A and 66B will be caused to rotate about axes of rotation 99A and 99B away from one another.

Figure 5:
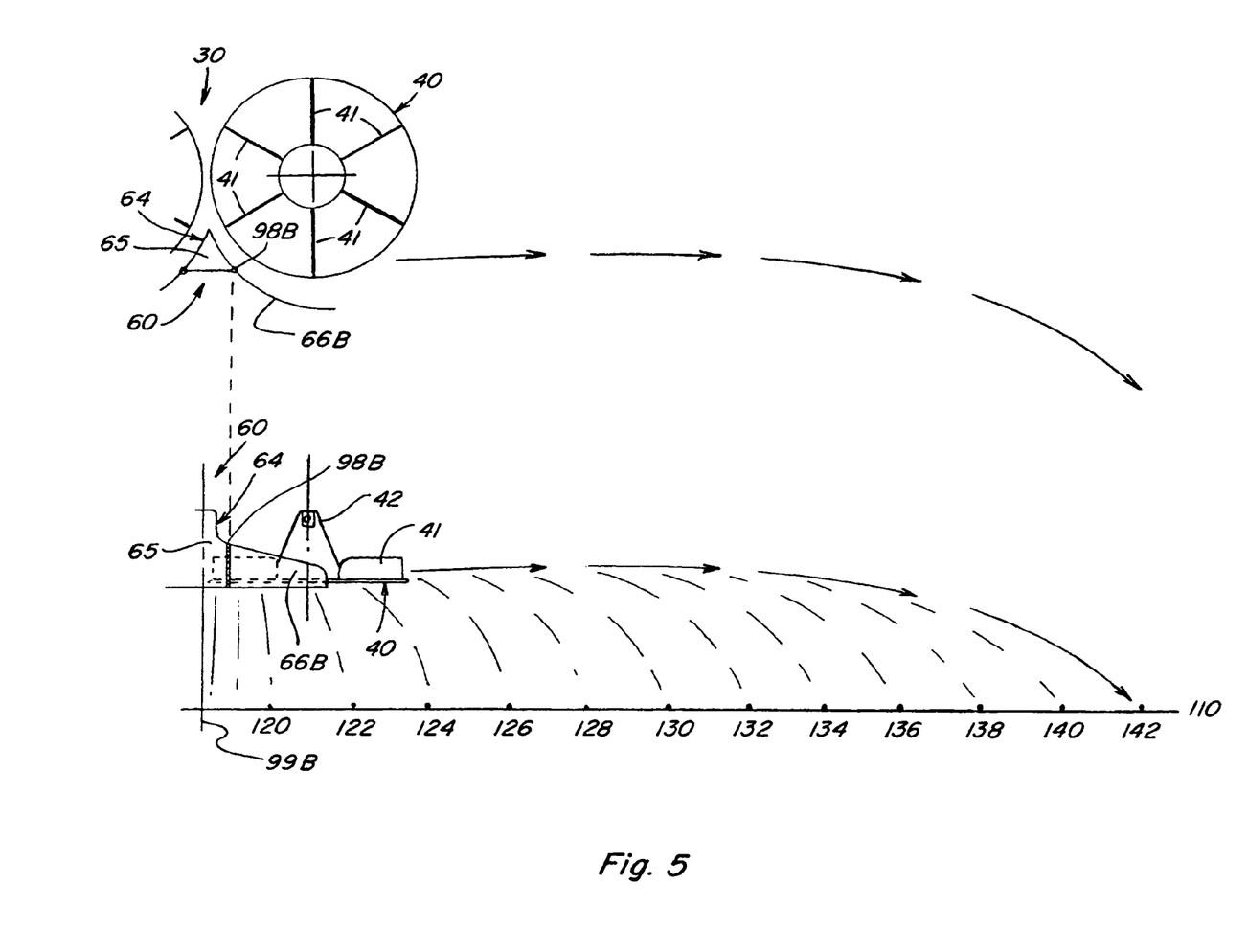
FIG. 5 is a simplified rear view of the right rear end of the spreader assembly and associated residue splitter, in combination with a top view of the residue splitter, diagrammatically illustrating characteristics of a pattern of crop residue flow distribution therefrom.

As will be appreciated from FIG. 5, improved crop residue distribution can be achieved by using a residue splitter according to the present invention in conjunction with a horizontal spreader assembly such as spreader 30 on combine 22, especially when the lateral expanse of the residue splitter can be controllably varied. As has been discussed hereinabove, when the residue splitter is used with a horizontal spreader assembly, a more even or uniform crop residue distribution pattern, such as along pattern line 110, can be achieved than if the spreader paddles were allowed to operate with no residue splitter. By making appropriate adjustments to the lateral expanse of the residue splitter, the sidewardly projection of the crop residue impacting the crop residue flow surfaces and then traveling therealong can be varied to some degree, with the points 120-142 in FIG. 5 illustrating approximate locations along pattern line 110 where crop residue flowing along the corresponding lines associated with such points may be distributed on a field when the lateral expanse of residue splitter 60 is set at a given amount, with point 142 here considered to be the approximately maximum amount of sideward distribution obtainable. Under a given set of conditions, if the lateral expanse of residue splitter 60 is decreased, the spread width will often decrease to some extent, for example, such that the distribution may extend sidewardly only to about point 138 or 134, instead of to point 142.

Figure 6:
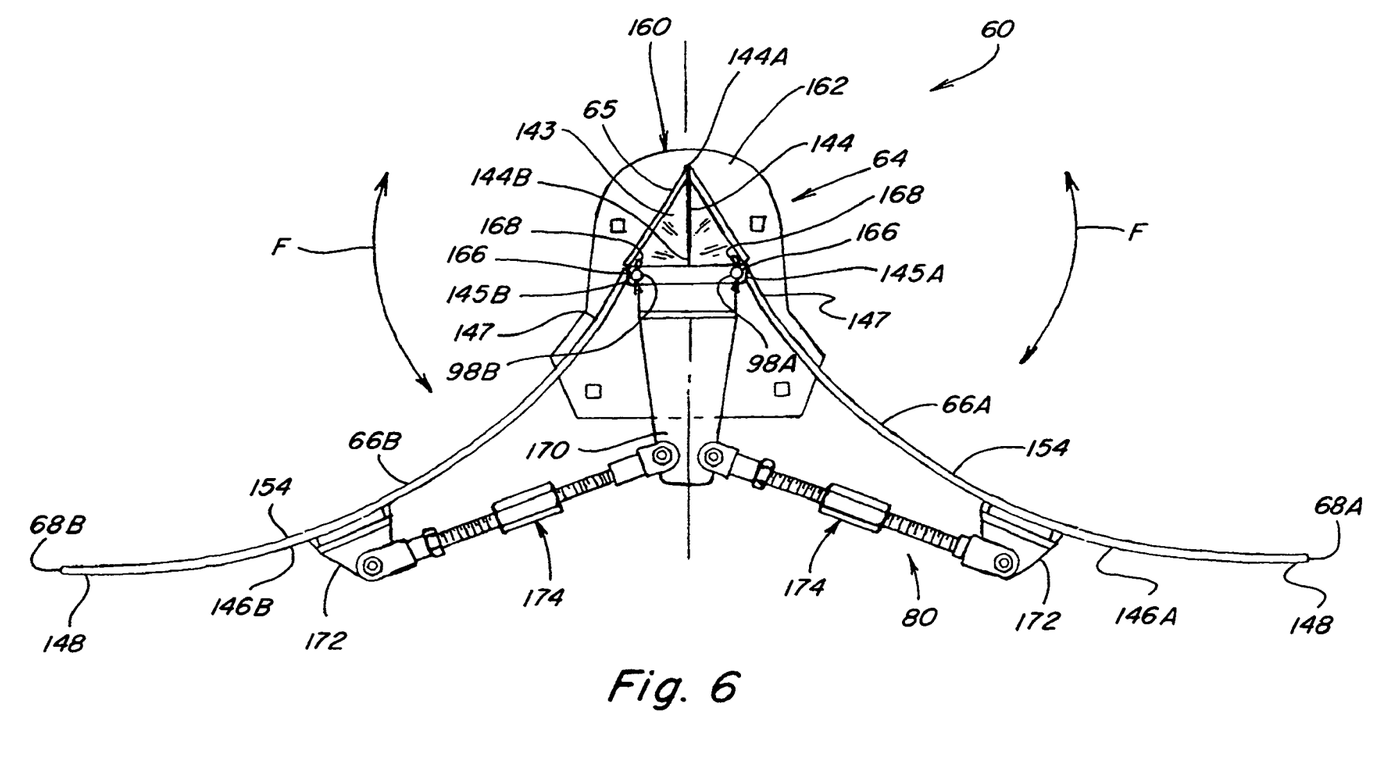
FIG. 6 is a bottom plan view of another preferred form of a residue splitter according to the present invention, which residue splitter employs a different adjustment mechanism.
Figure 7:
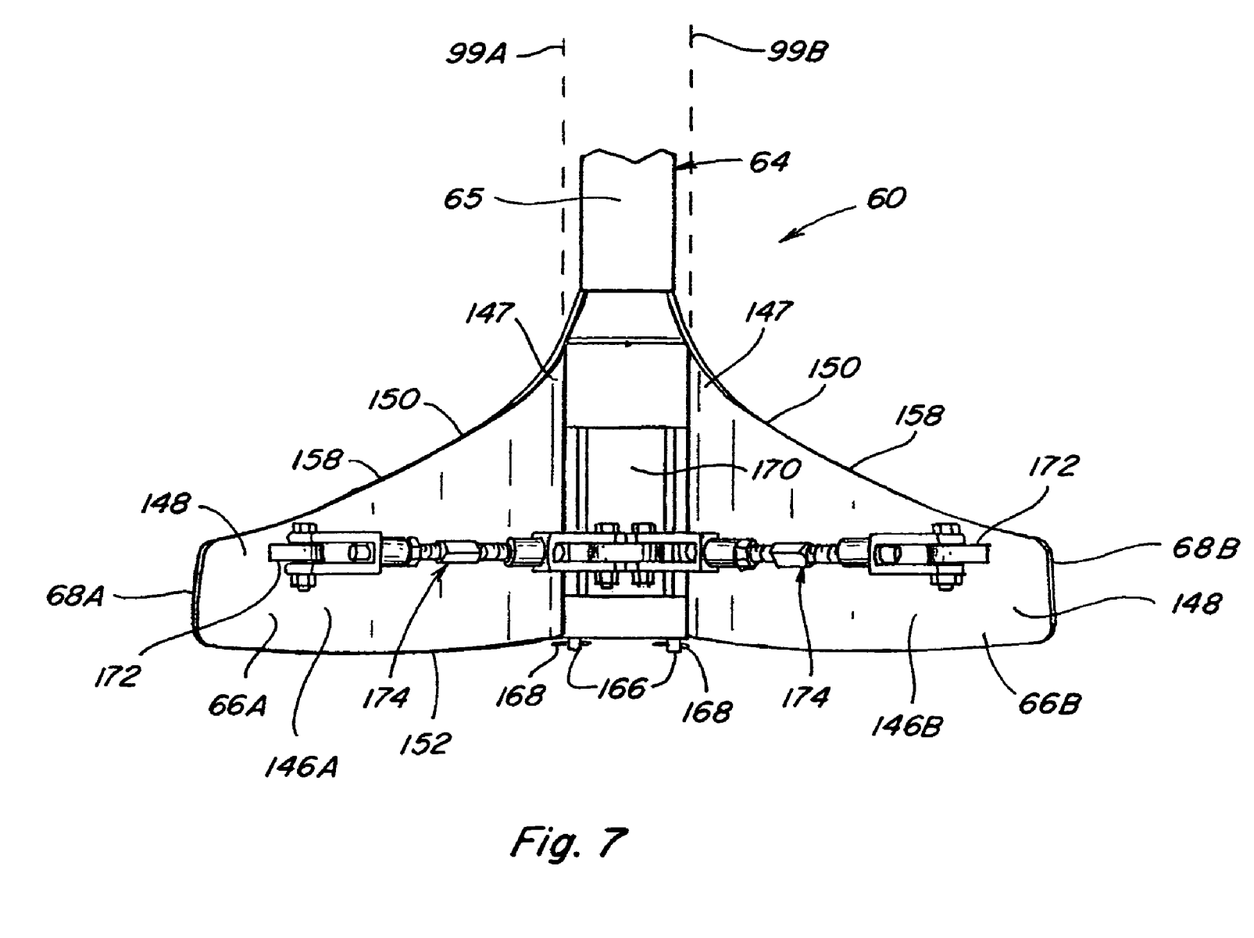
FIG. 7 is a rear view of the residue splitter of FIG. 6.
Figure 8:
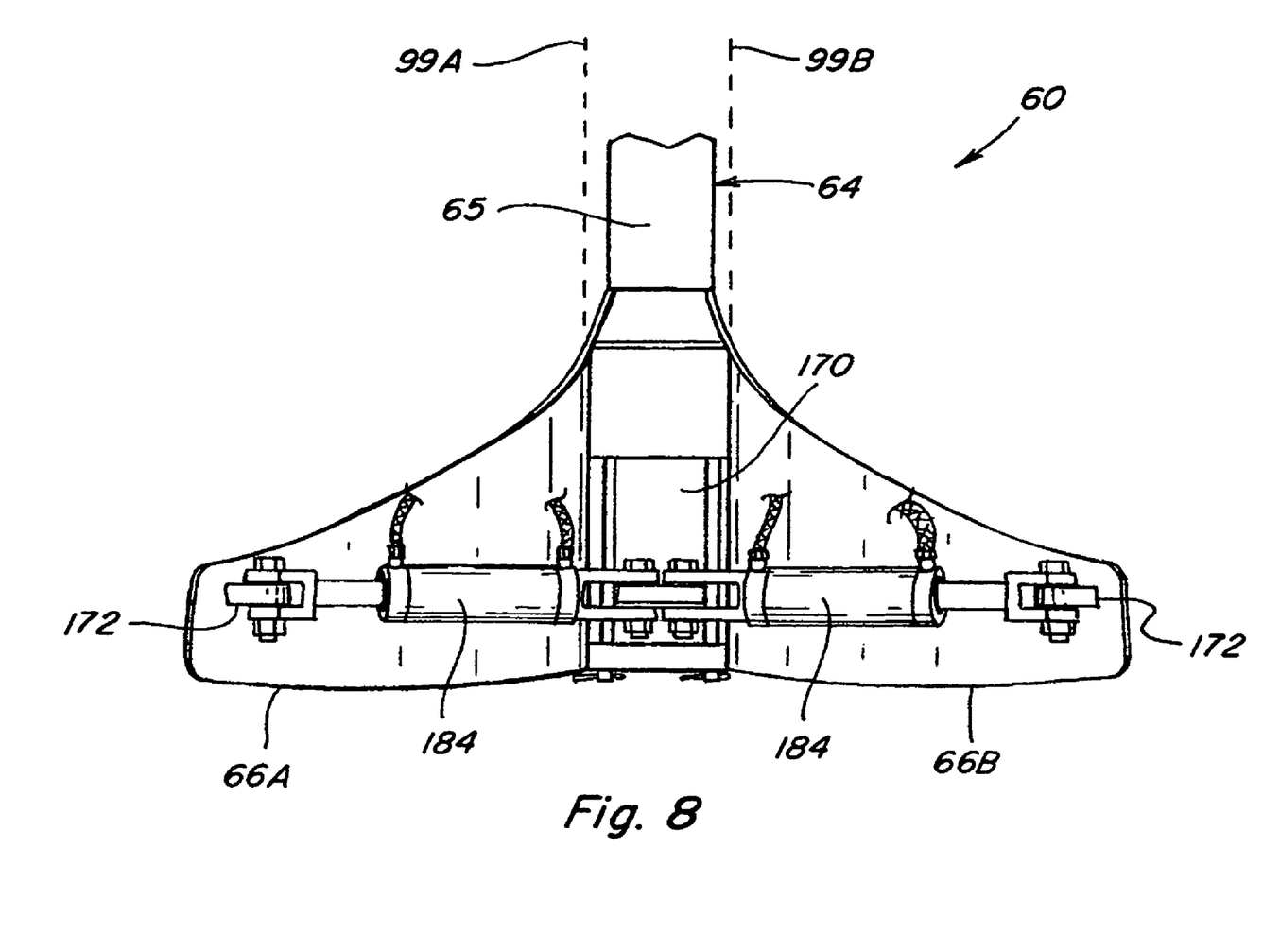
FIG. 8 is a rear view, similar to FIG. 7, of another preferred form of a residue splitter according to the present invention, which residue splitter employs a still different adjustment mechanism including a remotely controllable actuator.

FIGS. 6-8 depict several alternative embodiments of a residue splitter and are presented herewith to further illustrate certain features and elements of the invention and various constructions and configurations that can be employed to much the same effect as the embodiment and variations thereof discussed hereinabove.

In such regard, FIGS. 6-7 depict an alternative embodiment of a residue splitter 60 that includes a flow guide element 64 with a front edge portion 65 that includes a generally wedge-shaped body portion 143 having a defined leading edge 144 that extends downwardly and rearwardly at an inclination to the vertical from a front, top end 144A to a rear, bottom end 144B, with such wedge-shaped body portion 143 having generally horizontal cross-sectional slices, when taken along said defined leading edge 144 from said front, top end 144A to said rear, bottom end 144B, of generally isosceles triangular shapes having decreasing areas. Arm portions 66A and 66B are attached to said front edge portion 65 to extend generally rearwardly and sidewardly from the opposite, rear, corner edge portions 145A and 145B of the front edge portion 65, but with a somewhat different adjustment mechanism 80 than that previously described associated with the back sides 146A and 146B of arm portions 66A and 66B. Arm portions 66A and 66B are essentially mirror images of one another and are preferably of suitable, generally rigid construction, such as of sheet metal, or plastic. Each of the arm portions 66A and 66B includes a first end portion 147, a second end portion 148 opposite first end portion 147, a top edge 150 and an opposite bottom edge 152 (FIG. 7) extending between the first and second end portions 147 and 148, defining a crop residue flow surface 154 (FIG. 6) extending between end portions 147 and 148 for guiding and carrying the received crop residue flow sidewardly outwardly away from horizontal spreader assembly 30. Crop residue flow surfaces 154 are preferably of an arcuate, concave shape end-to-end and top edges 150 are preferably tapered along at least edge portions 158.

A support structure 160 for mounting the flow guide element 64 to the cover plate 62 extending over the top of spreader assembly 30 preferably includes a top plate 162 at the top of front edge portion 65 mountable in a suitable manner, such as by bolts or other fasteners, to a central region of cover plate 62 so that the mounted flow guide element 64 will be at least generally aligned with a centerline extending between spreader head assemblies 38A and 38B. When the support structure 60 is so mounted to cover plate 62, the front edge portion 65 will be positioned generally intermediate to spreader head assemblies 38A and 38B on a centerline therebetween, with the arm portions 66A and 66B extending rearwardly and sidewardly therefrom for dividing the crop residue being propelled generally rearwardly by the spreader paddles 40.

The first end portions 147 of the arm portions 66A and 66B are connected to front edge portion 65 along respective hinged axes 99A and 99B (FIG. 7) by extended pivot pins 166 retained in position by cotter pins 168, thus allowing the arm portions 66A and 66B to be rotatable about hinged axes 99A and 99B as denoted by arrows F in FIG. 6. In the embodiment of FIGS. 6-7, pivot pins 166 also support a center bracket 170 that extends generally centrally rearwardly from front edge portion 65, the purpose of which will become apparent from that which follows. The arm portions 66A and 66B include brackets 172 on the backsides 146A and 146B thereof between end portions 147 and 148 of such arm portions 66A and 66B. Respective turnbuckle assemblies 174 are pivotally connected to both center bracket 170 and brackets 172 on arm portions 66A and 66B, and are individually adjustable for varying the rotational position of the respective arm portions 66A and 66B about their hinged axes 99A and 99B (FIG. 7), as desired or required for achieving a particular crop residue distribution pattern, particularly the overall width thereof.

FIG. 8 depicts still another form of residue splitter 60, generally similar to the embodiment of FIGS. 6-7, but which employs remotely controllable actuators 184 connected between center bracket 170 and brackets 172 on arm portions 66A and 66B in place of turnbuckles 174 for effecting rotational movements of the arm portions 66A and 66B about hinge axes 99A and 99B, either independently, or jointly. Such actuators 184 can be any suitable commercially available devices, such as, but not limited to, hydraulic, electric, or other motors, cylinders, solenoids, or the like, and can be controlled from a suitable location, such as an operator cab of the combine.

It will be appreciated by those skilled in the art that the angle or taper that may be applied to the top edge of the arm portions 66A and 66B for metering of a flow of crop residue thereacross may be selected to secure the metered distribution desired under particular conditions or with particular crops and that, especially with residue splitter embodiments that employ separate arm portions hingedly or otherwise joinable to the front edge portion of the residue splitter, various replaceable arm portions having different angles or tapers could selectively be employed by a user depending upon all attendant circumstances, including the type of crop and the sizes of resultant crop residue particles being distributed by the horizontal spreader assembly.

Additionally, although the embodiments discussed hereinabove have been described and their operations discussed relative to mountings of the residue splitter to a cover plate that extends over at least a portion of the horizontal spreader assembly, it should be understood that the use of a cover plate is not required and that any form or method of mounting that would position the front edge portion of the residue splitter intermediate to the spreader paddles of the horizontal spreader assembly, preferably approximately centered along a centerline extending between the spreader paddles, to accomplish the results sought may be considered acceptable.

Moreover, although the front edge portion of the residue splitter has been depicted in the various embodiments discussed hereinabove as being essentially wedge-shaped with a defined leading, elongated vertex edge or portion, inclined relative to the vertical, the front edge portion could have other shapes and configurations, and the leading edge portion could be more pointed, rounded, or bullet-shaped, instead of being a sharply defined edge, and need not necessarily be elongated or at an inclination to the vertical, so long as it serves with the arm portions extending therefrom to divide the crop residue being directed thereto by the adjacent spreader paddles and to direct the crop residue in accordance with the present invention. In such regard, the front edge portion may even be in or take the form of a hinge-like apparatus or mechanism about which the extending arm portions may rotate or open and close relative to one another, with both arms being rotatable or movable about a common axis of rotation or movement.

Especially in light of the many possible forms and variations that the front edge portion and the arm portions may assume, it should be apparent that any adjustment mechanism that may be employed therewith may likewise take numerous forms, and it should be appreciated that the several adjustment mechanisms discussed hereinabove are but a few examples of the many forms and variations of adjustment mechanisms that could be utilized with or as part of the present invention.

Although the residue splitter apparatus of the present invention has been described and discussed relative to its use with horizontal spreader assemblies of an agricultural combine, its use need not be limited to such applications, and it should be understood that such residue splitter apparatus could also be readily and conveniently incorporated into or utilized with horizontal spreader assemblies in other applications and for other uses, including the spreading of materials other than crop residue, consistent with the disclosures herein and within the spirit and scope of the invention.

Accordingly, in light of all the foregoing, it should thus be apparent to those skilled in the art that there has been shown and described a residue splitter that is usable with a horizontal spreader assembly for more uniformly distributing material such as crop residue being provided to a horizontal spreader assembly. However, it should also be apparent that, within the principles and scope of the invention, many changes are possible and contemplated, including in the details, materials, and arrangements of parts which have been described and illustrated to explain the nature of the invention. Thus, while the foregoing description and discussion addresses certain preferred embodiments or elements of the invention, it should further be understood that concepts of the invention, as based upon the foregoing description and discussion, may be readily incorporated into or employed in other embodiments and constructions without departing from the scope of the invention. Accordingly, the following claims are intended to protect the invention broadly as well as in the specific form shown, and all changes, modifications, variations, and other uses and applications which do not depart from the spirit and scope of the invention are deemed to be covered by the invention, which is limited only by the claims which follow.

What is claimed is:

1. A residue splitter apparatus for a horizontal spreader having an inlet opening for receiving material and a pair of spreader paddles disposed generally side-by-side for rotation about generally vertical axes and downstream from the inlet opening, comprising a flow guide element having top and bottom portions, a front edge portion, and a pair of opposed arm portions extending rearwardly and sidewardly from said front edge portion to free end portions, wherein said arm portions are hingedly connected to said front edge portion to be rotatable towards and away from one another, said arm portions including surfaces extending between said top and bottom portions of said flow guide element towards said free end portions, said extending surfaces defining material flow surfaces, said flow guide element disposed with said front edge portion generally intermediate to the spreader paddles with said arm portions extending rearwardly and also outwardly sidewardly from one another to generally aft of at least portions of the spreader paddles, whereby, as a flow of material is introduced into the inlet opening of the spreader at least a portion of such flow is directed towards said material flow surfaces of said flow guide element by operation of the spreader paddles and is adjustably directed by said flow guide element, dependent upon its positioning relative to the spreader paddles, sidewardly outwardly to controllably distribute the material in a desired pattern behind the spreader.

2. The residue splitter apparatus of claim 1 wherein said front edge portion includes a generally wedge-like body portion with a leading edge portion and laterally extending leading sides.

3. The residue splitter apparatus of claim 2 wherein said arm portions are extensions of said laterally extending leading sides.

4. The residue splitter apparatus of claim 1 wherein said arm portions are formed and configured to be generally rigid and resistant to impact yet sufficiently flexible to permit said free end portions of said arm portions to be movable towards one another by the application of forces to said arm portions along the extents thereof towards said free end portions.

5. The residue splitter apparatus of claim 4 wherein said free end portions are adjustably movable and positionable by a user to vary the lateral distance between said free end portions.

6. The residue splitter apparatus of claim 2 wherein said leading edge portion includes a defined leading edge.

7. The residue splitter apparatus of claim 6 wherein said defined leading edge extends generally downwardly and rearwardly at an inclination to the vertical.

8. The residue splitter apparatus of claim 1 wherein said arm portions have front and rear end portions and leading side surfaces extending between said front and rear end portions, such leading side surfaces forming said material flow surfaces along which material impacting said leading side surfaces flows.

9. The residue splitter apparatus of claim 8 wherein said leading side surfaces are generally arcuate.

10. The residue splitter apparatus of claim 9 wherein said leading side surfaces include a generally concave end-to-end portion between said front and rear end portions of said arm portions.

11. The residue splitter apparatus of claim 8 wherein said arm portions are laterally movable relative to one another to effect movement of said free end portions of said arm portions towards and away from one another.

12. The residue splitter apparatus of claim 8 wherein said arm portions include top end portions extending between said front and rear end portions of said arm portions, said arm portions being tapered along at least a portion of said top end portions to form metering edges therealong.

13. The residue splitter apparatus of claim 1 wherein said arm portions are rotatable about a common axis of rotation.

14. The residue splitter apparatus of claim 1 wherein said arm portions are rotatable about respective axes of rotation.

15. The residue splitter apparatus of claim 14 wherein said front edge portion includes a generally wedge-shaped body portion with a leading edge portion and side surfaces extending rearwardly and sidewardly therefrom to opposite rear corner portions, said arm portions hingedly connected to said opposite rear corner portions of said front edge portion.

16. The residue splitter apparatus of claim 1 including an adjustment mechanism for varying the lateral expanse of said material flow surfaces aft of the spreader paddles.

17. The residue splitter apparatus of claim 16 wherein said arm portions include back sides and wherein said adjustment mechanism is connected between said back sides of said arm portions and is operable to effect movement of at least said free end portions of said arm portions towards and away from one another.

18. The residue splitter apparatus of claim 17 wherein said adjustment mechanism includes a first positioning member attached to the back side of one of said arm portions, a second positioning member attached to the back side of the other of said arm portions, and an adjustment controller operably connected to said first and second positioning members to effect movement of said positioning members and corresponding movement of the arm portions to which said positioning members are attached.

19. The residue splitter apparatus of claim 18 wherein said first and second positioning members are threaded and said adjustment controller includes engagement portions complementarily threaded to engage said first and second positioning members, said adjustment controller operable to adjust the engagement between said first and second positioning members and said engagement portions to thereby effect adjustment of the lateral expanse of said material flow surfaces aft of the spreader paddles.

20. The residue splitter apparatus of claim 17 wherein said adjustment mechanism includes a pair of turnbuckle assemblies, each of which turnbuckle assemblies is operatively installed extending between a back side of an arm portion and said front edge portion, said turnbuckle assemblies operable to effect movement of said free ends of said arm portions towards and away from one another.

21. The residue splitter apparatus of claim 17 wherein said adjustment mechanism includes a pair of actuators each operatively connected to one of said arm portions, said actuators being remotely controllable by an operator to effect movement of said free ends of said arm portions towards and away from one another.

22. A method for controlling the spread width distribution of material from a horizontal spreader having an inlet opening for receiving the material and a pair of spreader paddles disposed generally side by side for rotation about generally vertical axes and downstream from the inlet opening to distribute the material, comprising providing a residue splitter apparatus including a flow guide element having top and bottom portions, a front edge portion, and a pair of opposed arm portions extending rearwardly and sidewardly from said front edge portion to free end portions, wherein said arm portions are hingedly connected to said front edge portion to be rotatable towards and away from one another, said arm portions including surfaces extending between said top and bottom portions of said flow guide element towards said free end portions, said extending surfaces defining material flow surfaces, installing said flow guide element with said front edge portion positioned generally intermediate to the spreader paddles with said arm portions extending rearwardly and also outwardly sidewardly from one another to generally aft of at least portions of the spreader paddles, operating the horizontal spreader to effect distribution of material thereby, whereby, as a flow of material is introduced into the inlet opening of the spreader at least a portion of such flow is directed towards said material flow surfaces of said flow guide element by operation of the spreader paddles and is adjustably directed by said flow guide element, dependent upon its positioning relative to the spreader paddles, sidewardly outwardly to controllably distribute the material in a desired pattern behind the spreader.

23. The method of claim 22 wherein said flow guide element includes an adjustment mechanism for varying the lateral expanse of said material flow surfaces.

24. A method of controlling the spread width distribution of material from a horizontal spreader having an inlet opening for receiving the material and a pair of spreader paddles disposed generally side by side for rotation about generally vertical axes and downstream from the inlet opening to distribute the material, comprising providing a residue splitter apparatus installed generally intermediate to the spreader paddles to extend rearwardly and also outwardly sidewardly around the spreader paddles to generally aft of at least portions of the spreader paddles, said residue splitter apparatus including a flow guide element having top and bottom portions, a front edge portion, a pair of opposed arm portions extending rearwardly and sidewardly from said front edge portion to free end portions, wherein said arm portions are hingedly connected to said front edge portion to be rotatable towards and away from one another, and an adjustment mechanism operatively connected to said arm portions and operable to effect movement of said arm portions towards and away from one another, said arm portions including surfaces extending between said top and bottom portions of said flow guide element towards said free end portions, said extending surfaces defining material flow surfaces, operating said adjustment mechanism to adjust the lateral expanse of said material flow surfaces aft of the spreader paddles to a desired expanse, operating the horizontal spreader to effect distribution of material thereby, whereby, as a flow of material is introduced into the inlet opening of the spreader at least a portion of such flow is directed towards said material flow surfaces of said flow guide element by operation of the spreader paddles and is directed by said flow guide element, dependent upon the adjusted positioning of said material flow surfaces relative to the spreader paddles, sidewardly outwardly to controllably distribute the material in a desired pattern behind the spreader.

* * * * *